(12) United States Patent
Jaw et al.

(10) Patent No.: US 6,898,554 B2
(45) Date of Patent: May 24, 2005

(54) FAULT DETECTION IN A PHYSICAL SYSTEM

(75) Inventors: Link C. Jaw, Scottsdale, AZ (US); Dong-Nan Wu, Tempe, AZ (US)

(73) Assignee: Scientific Monitoring, Inc., Scottsdale, AZ (US)

( * ) Notice: Subject to any disclaimer, the term of this patent is extended or adjusted under 35 U.S.C. 154(b) by 789 days.

(21) Appl. No.: 09/726,928

(22) Filed: Nov. 30, 2000

(65) Prior Publication Data

US 2002/0066054 A1 May 30, 2002

Related U.S. Application Data

(60) Provisional application No. 60/210,954, filed on Jun. 12, 2000.

(51) Int. Cl.[7] ............................................. G06F 11/30
(52) U.S. Cl. ........................................ 702/185; 701/101
(58) Field of Search ............................. 702/35, 58, 59, 702/182–185, 187, 188, 100, 106, 107, 32–34, 71, 79, 82, 90, 104; 714/735–737; 73/649, 772; 701/99, 101, 100, 106, 107

(56) References Cited

U.S. PATENT DOCUMENTS

| | | | | |
|---|---|---|---|---|
| 4,644,479 A | * | 2/1987 | Kemper et al. ............ 702/185 |
| 5,339,782 A | * | 8/1994 | Golzer et al. ............. 123/399 |
| 5,566,092 A | * | 10/1996 | Wang et al. .............. 702/185 |
| 5,682,317 A | * | 10/1997 | Keeler et al. ............. 701/101 |
| 6,073,262 A | * | 6/2000 | Larkin et al. ............. 714/736 |
| 6,098,011 A | * | 8/2000 | Scott ..................... 701/100 |
| 6,577,976 B1 | * | 6/2003 | Hoff et al. ................ 702/95 |

* cited by examiner

*Primary Examiner*—Marc S. Hoff
*Assistant Examiner*—Mohamed Charioui
(74) *Attorney, Agent, or Firm*—Stites & Harbison PLLC

(57) ABSTRACT

A method for detecting a fault in a physical system uses a model of the physical system and calculates estimated dependent variables or conditions for the system using substantially only independent variables that are measured from the system using hardware redundancy or selected based on their better measurement reliability. An example of hardware redundancy is to measure an independent variable using two or more sensors rather than one. The estimated dependent variables are compared to the corresponding measured dependent variable conditions to calculate residuals, which are then analyzed using appropriate fault detection techniques. The method is especially effective relative to prior fault detection method when used to detect anomalies or unknown fault states of the system.

48 Claims, 3 Drawing Sheets

| ACTUAL MEASURED VARIABLES | CORRESPONDING PHYSICAL CONDITION |
|---|---|
| P2 | INLET PRESSURE |
| T2 | INLET TEMPERATURE |
| N1 | LOW-PRESSURE SPOOL SPEED |
| N2 | HIGH-PRESSURE SPOOL SPEED |
| P3 | COMPRESSOR DISCHARGE PRESSURE |
| T5 | TURBINE TEMPERATURE |
| x_wf | FUEL METERING VALVE POSITION |

| DERIVED VARIABLE | CORRESPONDING PHYSICAL CONDITION |
|---|---|
| T4 | TURBINE INLET TEMPERATURE |

FAULT DETECTION IN A PHYSICAL SYSTEM

This application claims the benefit of Provisional Application No. 60/210,954, Filed Jun. 12, 2000.

The U.S. Government has a paid-up license in this invention and the right in limited circumstances to require the patent owner to license others on reasonable terms as provided for by the terms of Contract No. F33615-98-C-2890 awarded by the Air Force Research Laboratory, Wright-Patterson AFB.

BACKGROUND

The present invention relates in general to the detection of system faults and more particularly to the detection of anomalies in a physical system.

The maintenance and monitoring of physical systems, including complex systems like aircraft engines, rocket propulsion systems, and aerospace vehicles, is important for the prevention and detection of abnormal operating conditions. In particular, it is desired to detect operating conditions of the physical system that correspond to unknown fault modes, or simply anomalies.

Traditional approaches have not been effective in detecting certain types of faults or failures, especially the detection of anomalies in complex systems. The detection of anomalies is typically more difficult than the detection of known failure modes because the failure mode has not been previously identified or categorized. Some prior failure detection approaches are based on data-driven signal-processing that examines the statistical characteristics of measured data streams obtained from a system. However, these types of approaches are not well-suited to detecting anomalies of a system that experiences large variations in operating variables and frequent mode switching, and have only provided limited accuracy in detecting such anomalies. Further, these and other types of fault detection approaches have required significant amounts of domain expertise or physical knowledge about the system, thus increasing the cost and difficulty of detecting anomalies. Anomaly failure detection by such approaches is further complicated in complex systems due to the wide variation of operating conditions, especially when the system is not at steady-state.

Accordingly, there is a need for an improved way to detect anomalies in physical systems that reduces the extent of knowledge required about the system, that can handle failure modes that exceed the data parameter space collected about the prior operation of the system, and that can readily handle anomaly detection in the complicated operational modes observed in complex physical systems.

DETAILED DESCRIPTION

Figure 1:
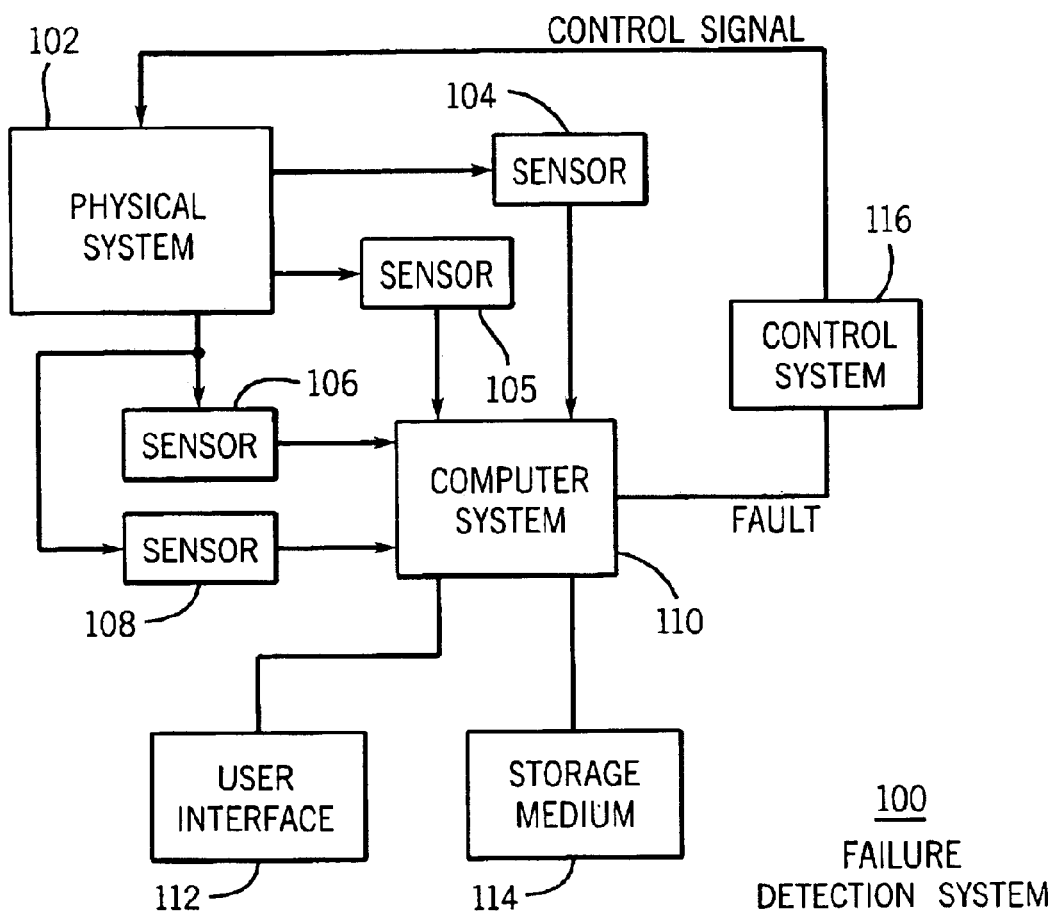
FIG. 1 illustrates a failure detection system according to the present invention.

FIG. 1 illustrates a fault or failure detection system 100 according to the present invention. System 100 is used to detect faults in a physical system 102, such as for example a gas-turbine engine or an air vehicle. Sensors 104, 105, 106, 108 are used to measure operating conditions or variables about physical system 102. Examples of such conditions include temperature, pressure, flow rates, and speed. A computer system 110 receives the measured variables from sensors 104–108 and processes these measurements to detect a fault as described in more detail below. A user interface 112 is coupled to computer system 110 and used to alert a user to a fault condition. Interface 112 may alternatively be an interface to another machine or computer system (not shown) by which computer system 110 can initiate an event or action in the other machine or computer system in response to a fault detection.

A storage medium 114, for example a computer hard drive or other non-volatile memory storage unit, stores computer programs used to operate computer system 110 according to the method of the present invention as described below. A control system 116 provides control signals (indicated simply as "CONTROL SIGNAL") to control the operation of physical system 102. Computer system 110 provides a FAULT signal to control system 116, which may be used to initiate a change in a control variable of physical system 102 if a fault is detected.

Figure 2:
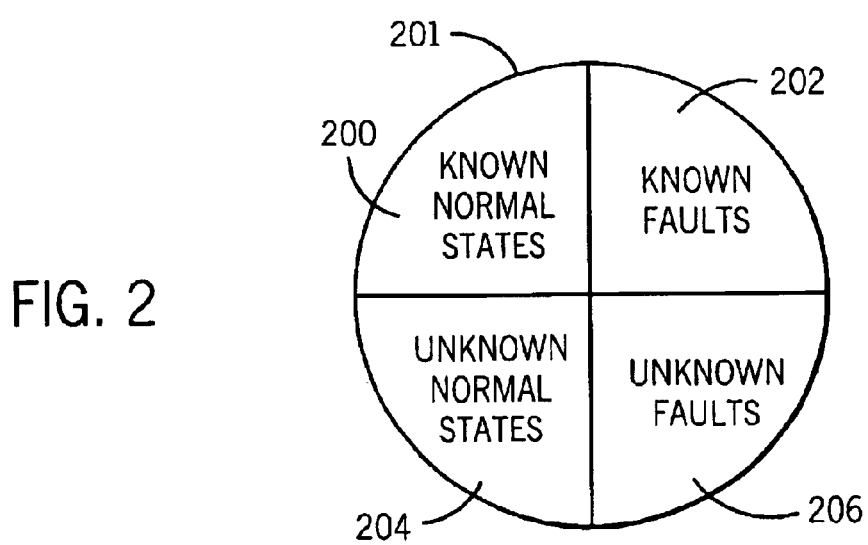
FIG. 2 illustrates the general operational states of a physical system.

FIG. 2 illustrates the general operational states of physical system 102, which are graphically represented as regions 200, 202, 204, and 206 in a circle 201. Circle 201 represents all possible conditions of physical system 102. More specifically, regions 200 and 202 correspond to known operational states of physical system 102, where region 200 represents known normal states and region 202 represents known faults or failure modes.

Regions 204 and 206 correspond to unknown operational states of physical system 102, where region 206 represents unknown faults and region 204 represents unknown normal states. The fault detection system and method according to the present invention is primarily directed to detecting faults that fall within region 206. These unknown faults are generally referred to herein as anomalies. Anomalies include both continuing and intermittent faults. It should also be appreciated that the present invention is applicable to and useful for detecting known faults.

Because anomalies correspond to unknown types of failures, they are generally the most difficult type of fault to detect in part because these types of failures are difficult to model. As will be discussed further below, the present invention improves the ability to detect anomalies to permit corrective action such as, for example, computer system 110 initiating a change in the CONTROL SIGNAL provided by control system 116 to physical system 102 or providing an alert through interface 112 that leads to corrective maintenance action during a scheduled down time for physical system 102.

Figure 3:
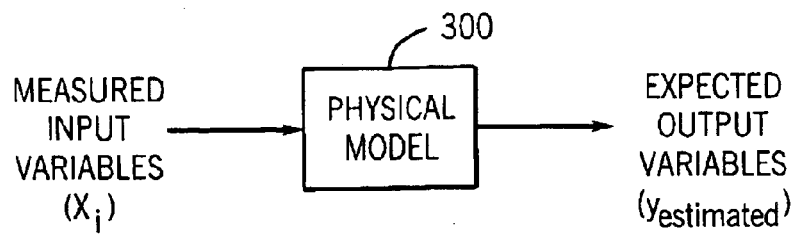
FIG. 3 illustrates the inputs and outputs in a physical model.

FIG. 3 illustrates the inputs and outputs in a physical model 300 that is used to model the physical behavior of physical system 102. According to the present invention as discussed further below, physical model 300 is selected or developed for estimating expected output variables $y_{estimated}$ based on measured input variables $x_i$. The expected output variables are considered to be dependent variables in physical model 300, and the measured input variables $x_i$ are considered to be independent variables.

Variables $x_i$ correspond to measurements of actual physical conditions taken from physical system 102 using, for example, sensors 104, 105, 106 and 108. It should be noted that FIG. 1 is simplified, and in an actual complex system, there will typically be many sensors or other types of measuring devices that can provide data representing variables $x_i$. Some of these sensors provide independent variables for use in model 300 and other of these sensors provide other measured variables that can be compared to dependent variables calculated using the model.

Typically, physical model 300 is represented in a software program stored on storage medium 114 and executed on computer system 110. An example of a simple physical model is F=m*a, where F is force, m is the mass of an object, and a is the acceleration of a moving object measured by a sensor such as an accelerometer. Another example of a physical model is P=c*ρ*T, where P is pressure, c is a constant, ρ is the density of a gas, and T is temperature. Variables $y_{estimated}$ (for example, the pressure $P_{estimated}$) are in general compared to measured variables other than those used as independent variables $x_i$ (for example, the temperature T) in model 300, such as for example data measured and collected using sensor 104, to determine the presence or absence of an anomaly.

Figure 4:
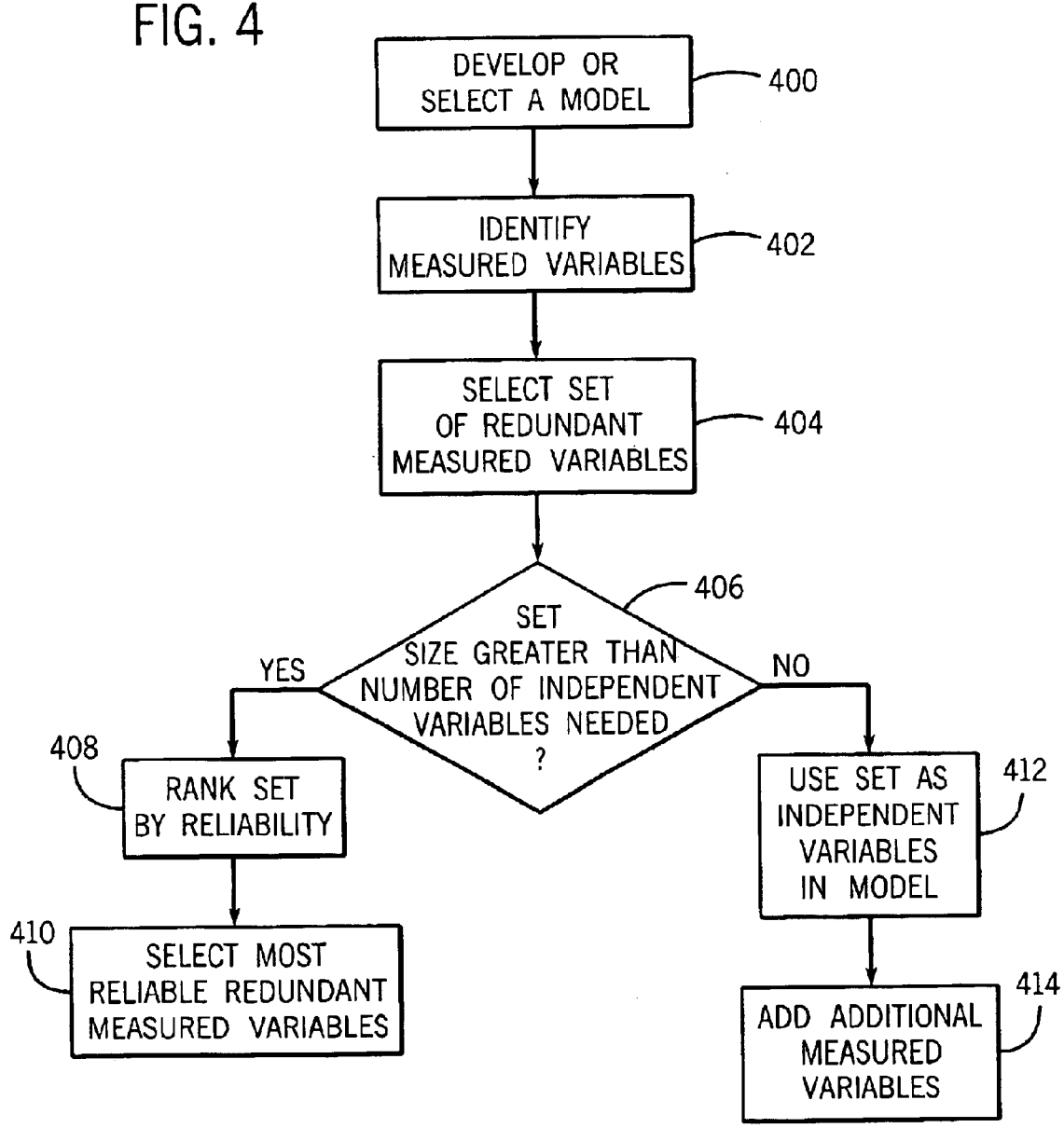
FIGS. 4 and 5 are flow charts illustrating steps in a failure detection method according to the present invention.
Figures 5, 6:
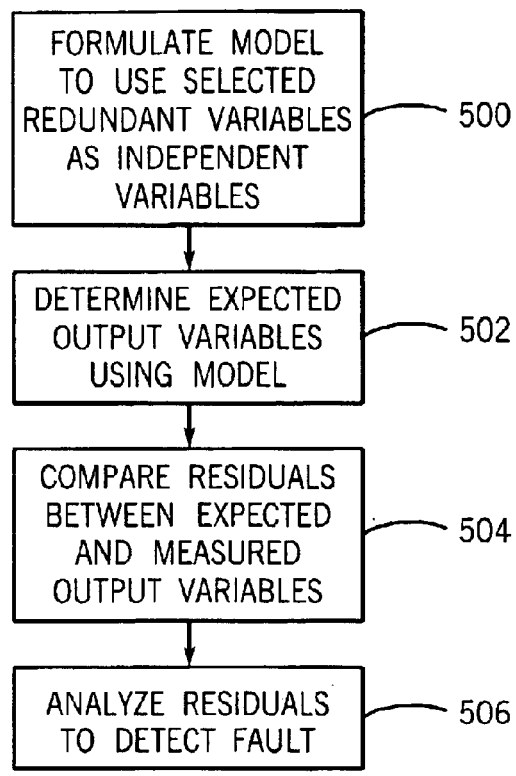
FIG. 6 is a table illustrating an example of actual and derived variables for a gas-turbine engine system.

FIGS. 4 and 5 are flow charts illustrating steps in a failure detection method according to the present invention. Specifically, FIG. 4 illustrates steps in the selection of a model and the independent variables $x_i$ for use in the model according to the present invention. In step 400, physical model 300 is developed or selected for use in fault detection system 100. Model 300 is a physical model that is preferably based at least in part on first principles of physics, such as for example, the models F=m*a or P=c*ρ*T as described above. Model 300 also preferably includes a model update scheme, which can be accomplished through the use of neural networks or other data-driven correction approaches. Model 300 may be represented generally as $y_{estimated}$=f($x_i$) *η($x_i$, t) where f($x_i$) is the primary component of the physical model and η($x_i$, t) is a data-driven correction factor, which may be implemented for example as a correction factor table having data that is updated with time. The use of the correction factor η($x_i$, t) reduces the need to know completely how physical system 102 works. As part of the model update scheme mentioned above, η($x_i$, t) can be represented in a data table that is updated periodically using calibration results, test or inspection results, or other more accurate or complete models of physical system 102.

Model 300 may be selected from models already developed by the manufacturer or other testing entity of physical system 102, or model 300 may be developed using first principles of physics appropriate for system 102. Model 300 may be a simplified physical model because the data-driven correction factors reduce the need for sophistication. It is preferred that selected model 300 be an adaptive physical model such that the parameters in the model change with time to adapt to changing system conditions or other factors so that model 300 is more closely matched to the current state of physical system 102.

In step 402, the actual measured variables associated with physical system 102 are identified. These variables generally include some control variables, which set the operating conditions of physical system 102. As an example, the actual measured variables may include pressure (P) and temperature (T). These variables generally correspond to those conditions that are measured by sensors 104–108 of FIG. 1. This set of actual measured variables will include both variables that will later be selected as independent variables $x_i$ and variables that will be used as actual output variables $y_{actual}$ for comparison with variables $Y_{estimated}$.

According to the present invention, in step 404, a subset of hardware redundant measured variables is identified from the set of actual measured variables determined in step 402. These hardware redundant measured variables correspond to those variables that are measured using two or more sensors. For example, referring to FIG. 1, sensors 106 and 108 are illustrated as sensing the same condition or variable from physical system 102. Thus, this variable would be classified as hardware redundant. All or a portion of the selected set of hardware redundant variables, as determined by the specific modeling needs of physical system 102 and as described further below, will be used as independent input variables in model 300. The use of hardware redundant variables is advantageous because they significantly increase measurement reliability.

In step 406, the number of hardware redundant measure variables is compared to the degrees of freedom of physical system 102. The degrees of freedom generally determine the number of independent input variables $x_i$ needed for modeling physical system 102. If the size of the subset of redundant variables is equal to the number of independent variables needed in model 300, then in step 412 the subset is used as independent variables $x_i$. In step 414, if there is an insufficient number of redundant variables, then additional sensors are added to physical system 102 until the number of independent variables at least equals the degrees of freedom.

If the size of the subset of redundant variables is greater than the number of independent variables needed in model 300, then in step 408 the entire set of redundant variables is ranked by the reliability of the measurement. This reliability may be determined as the confidence of obtaining an accurate measurement from the existing or selected sensors for a given variable. In step 410, after the redundant variables have been ranked, then a subset of the redundant measured variables is created by selecting the required number of most reliable redundant variables to be used as independent variables $x_i$.

FIG. 5 illustrates steps in the formulation (or casting) of the selected model in a form for use according to the method of the present invention. Specifically, following step 410 or 414 as is applicable, in step 500 the model 300 selected in step 400 is formulated to use only the variables $x_i$ selected as discussed above for FIG. 4 as independent variables in model 300. The dependent variables $y_{estimated}$ will be calculated using variables $x_i$.

In step 502, expected output variables $y_{estimated}$ are determined using model 300 as formulated in step 500. Computer system 110 receives redundant measured variable inputs from sensors 106 and 108 or additional measured variables which may have superior measurement reliability (such as from sensor 105). Computer system 110 is executing a software program that uses model 300 to calculate variables $y_{estimated}$. Computer system 110 also receives other actual measured variables, for example from sensor 104, that correspond to measured output variables $y_{actual}$ that will be compared to variables $y_{estimated}$. Model 300 can also be expanded to include derived variables or synthesized variables, which are internal variables of physical system 102 not measured directly by sensors 104–108.

In step 504, computer system 110 compares variables $y_{estimated}$ to the actual measured output variables $y_{actual}$ to calculate residuals for each dependent variable modeled by model 300. These residuals represent the deviations or differences between the estimated and measured variables. If derived variables are included in model 300, such comparison or residual generation is either not performed for such derived variables or is performed between the derived variables and the estimated variables based on other sources of information or knowledge about physical system 102.

In step 506, the software program executing on computer system 110 analyzes the residuals to detect the presence of an anomaly. Conventional residual analysis techniques may be used to perform this analysis. Such techniques include, for example, thresholding and classification. Thresholding is preferably done first and involves determining whether each residual is greater than a predetermined threshold limit. If this limit is exceeded, then the output variable corresponding to that residual is considered to be anomalous. Accordingly, thresholding can be used to determine individual signal anomalies.

Classification involves an examination of the pattern of some or all of the residuals. Classification is typically used to detect an anomalous operating condition when thresholding fails to detect an individual signal anomaly, for example when all residuals are within their respective threshold limits. Classification may detect a system anomaly when the residual pattern indicates a new class or known failure mode. It should be noted that classification generally detects only a system or a functional anomaly, and not an individual signal anomaly.

FIG. 6 is a table illustrating an example of actual and derived variables for the case where physical system 102 is a gas-turbine engine system. Actual measured variables are listed along with the physical condition or variable of the engine system to which the actual measured variable corresponds. The actual measured variables are measured, for example, using sensors 104–108. An example of a derived variable for the engine system is also shown with its corresponding physical condition.

In an engine system, typical independent variables that may be used are P2, T2, N1, and N2. These variables should be either hardware redundant or more reliable than other measurements as discussed above. An example of an output variable is P3. Model 300 may model $P3_{estimated}$ as a function of P2, T2, N1, and N2, or simply set forth as $P3_{estimated}=f_1$ (P2, T2, N1, and N2). As discussed above, $P3_{estimated}$ is compared to the actual measured value of P3 to calculated a residual value for further analysis. Derived variable T4 also may be modeled as a function of P2, T2, N1, and N2, or simply set forth as $T4_{estimated}=f_2$ (P2, T2, N1, and N2). Derived variable T4 is used in analysis as generally discussed above for derived variables that may be included in model 300.

Advantages and Variations

By the foregoing description, a novel and unobvious method and system for detecting faults in a physical system has been disclosed. The fault detection system and method of present invention has the advantages of improved anomaly detection in part due to the use of more robust and reliable inputs than prior approaches and in part due to the method of formulating a physics-based model that provides improved system operating insights and the capability to estimate certain operating variables of the physical system. In addition, less expense and time is required to develop the model of the system and less knowledge is required about the system than with prior approaches directed to fault detection in complex physical systems.

Although specific embodiments have been described above, numerous modifications and substitutions may be made thereto without departing from the spirit of the invention. For example, the fault detection method and system according to the present invention may be used with a wide variety of physical systems in addition to those described above. Further, the present invention can be applied generally to fault detection and isolation, and is not limited to only anomaly detection. Accordingly, the invention has been described by way of illustration rather than limitation.

What is claimed is:

1. A method for detecting a fault in a system, comprising:
   obtaining a measurement for each of a plurality of variables corresponding to the operational state of the system;
   ranking the variables by the reliability of the measurement for each of the plurality of variables to provide a ranked list of the variables;
   selecting a first subset of the most reliable variables from the ranked list to provide a set of independent variables; and
   calculating expected system dependent variables using the set of independent variables to detect the fault.

2. The method of claim 1 wherein calculating expected system dependent variables comprises:
   developing a model corresponding to the system; and
   formulating the model to calculate the expected system dependent variables based on the set of independent variables.

3. The method of claim 2 wherein the model comprises physical model corresponding to the system.

4. The method of claim 3 wherein the physical model comprises model update scheme.

5. The method of claim 4 wherein the model update scheme comprises a correction factor based on data collected from operation of the system.

6. The method of claim 1 wherein at least one of the set of independent variables is measured using hardware redundancy.

7. The method of claim 6 wherein the hardware redundancy comprises measuring the at least one of the set of independent variables using at least two hardware measuring devices.

8. The method of claim 7 wherein the measuring devices are sensors.

9. The method of claim 1 wherein the fault is an anomaly.

10. A computer-readable medium comprising a computer program for operating a computer system to detect a fault in a physical system according to the method of claim 1.

11. The method of claim 1 further comprising:
    selecting a second subset of variables from the ranked list to provide a set of measured dependent variables; and
    comparing the expected system dependent variables to the set of measured dependent variables.

12. The method of claim 11 wherein the comparing comprises residual analysis.

13. The method of claim 1 wherein the system is selected from the group consisting of an aircraft engine, a rocket propulsion system, and an aerospace vehicle.

14. The method of claim 1 wherein measuring the plurality of variables comprises sensing operating conditions using at least one sensor.

15. The method of claim 1 wherein the reliability of the measurement is based on the confidence of accurately obtaining the measurement for each of the plurality of variables.

16. The method of claim 1 wherein the expected system dependent variables are calculated substantially only using the set of independent variables.

17. A computer system for detecting an anomaly in a physical system, comprising:
    means for providing a model of the physical system;
    means for receiving a plurality of sensor measurements from the physical system, wherein at least one sensor measurement is used as an independent variable and at least one sensor measurement is used as an actual sensor measurement;

means for processing the independent variable through the model of the physical system to generate an estimated variable as a function of the independent variable; and mean for comparing the estimated variable and the actual sensor measurement to determine an anomaly in the physical system.

18. The computer system of claim 17, further including a plurality of sensors coupled to the physical system for providing the plurality of sensor measurements.

19. The computer system of claim 18, wherein the plurality of sensors measure physical states of the physical system.

20. The computer system of claim 19, wherein the plurality of sensors include redundant sensors for a physical s ate of the physical system.

21. The computer system of claim 17, wherein a residual between the estimated variable and the actual sensor measurement is determined.

22. The computer system of claim 21, wherein the residual is compared to a threshold to determine the anomaly in the physical system.

23. The computer system of claim 21, wherein the residual is processed through a classification procedure to determine the anomaly in the physical system.

24. The computer system of claim 17, wherein the model of the physical system is given in the form of y=f(x)*n(x, t), where y is the estimated variable, x is the independent variable, t is time, f(x) is a physical response, and n(x, t) is a correction factor.

25. The computer system of claim 17, wherein the physical system is an engine.

26. An apparatus for detecting an anomaly in a system, comprising:

a plurality of sensors coupled to the system for providing sensor measurements, wherein a first sensor measurement represents an independent variable and a second sensor measurement represents an actual sensor measurement; and a computational system providing a model of the system, the computational system including, a) means for processing the independent variable through the model of the system to generate an estimated variable as a function of the independent variable, and b) means for comparing the estimated variable and the actual sensor measurement to determine an anomaly in the system.

27. The apparatus of claim 26, wherein a residual between the estimated variable and the actual sensor measurement is determined.

28. The apparatus of claim 27, wherein the residual is compared to a threshold to determine the anomaly in the system.

29. The apparatus of claim 27, wherein the residual is processed through a classification procedure to determine the anomaly in the system.

30. The apparatus of claim 26, wherein the plurality of sensors measure physical states of the system.

31. The apparatus of claim 30, wherein the plurality of sensors include redundant sensors for a physical state of the system.

32. The apparatus of claim 26, wherein the model of the system is given in the form of y=f(X)*n(x, t), where y is the estimated variable, x is the independent variable, t is time, if (x) is a physical response, and n(x, t) is a correction factor.

33. The apparatus of claim 26, wherein the system is an engine.

34. A system analysis tool for detecting an anomaly in a system, comprising;

a plurality of sensors coupled to the system for providing sensor measurements, wherein a first sensor measurement is used an independent variable and a second sensor measurement is used an actual sensor measurement; and a model of the system, the model including,
  (a) means for generating an estimated variable as a function of the independent variable, and
  (b) means for comparing the estimated variable and the actual sensor measurement to determine an anomaly in the system.

35. The system analysis tool of claim 34, wherein a residual between the estimated variable and the actual sensor measurement is determined.

36. The system analysis tool of claim 35, wherein the residual is compared to a threshold to determine the anomaly in the system.

37. The system analysis tool of claim 35, wherein the residual is processed through a classification procedure to determine the anomaly in the system.

38. The system analysis tool of claim 34, wherein the plurality of sensors measure physical states of the system.

39. The system analysis tool of claim 38, wherein the plurality of sensors include redundant sensors for a physical state of the system.

40. The system analysis tool of claim 34, wherein the model of the system is given in the form of y=f(x)*n(x, t), where y is the estimated variable, x is the independent variable, t is time, f(x) is a physical response, and n(x, t) is a correction factor.

41. The system analysis tool of claim 34, wherein the system is an engine.

42. A method for detecting an anomaly in a physical system, comprising:

providing a model of the physical system;

receiving a plurality of sensor measurements from the physical system, wherein a first sensor measurement is used as an independent variable and a second sensor measurement is used as an actual sensor measurement, processing the independent variable through the model of the physical system to generate an estimated variable as a function of the independent variable; and comparing the estimated variable and the actual sensor measurement to determine an anomaly in the physical system.

43. The method of claim 42, further including determining a residual between the estimated variable and the actual sensor measurement.

44. The method of claim 43, wherein the residual is compared to a threshold to determine the anomaly in the physical system.

45. The method of claim 43, wherein the residual is processed through a classification procedure to determine the anomaly in the physical system.

46. The method of claim 42, further including providing a plurality of sensors coupled to the physical system for providing the plurality of sensor measurements.

47. The method of claim 46, wherein the plurality of sensors measure physical states of the physical system.

48. The method of claim 42, wherein the model of the physical system is given in the form of y=f(x)*n(x, t), where y is the estimated variable, x is the independent variable, t is time, f(x) is a physical response, and n(x, t) is a correction factor.

* * * * *